(12) United States Patent
Martino-Gonzalez et al.

(10) Patent No.: US 11,267,584 B2
(45) Date of Patent: Mar. 8, 2022

(54) METHOD FOR MANUFACTURING A REAR SECTION OF AN AIRCRAFT AND AIRCRAFT REAR SECTION

(71) Applicant: AIRBUS OPERATIONS S.L., Madrid (ES)

(72) Inventors: Esteban Martino-Gonzalez, Aranjuez (ES); Alberto Arana Hidalgo, Madrid (ES); Melania Sanchez Perez, Madrid (ES); Carlos Garcia Nieto, Pinto (ES); Jesus Javier Vazquez Castro, Madrid (ES); Edouard Menard, Madrid (ES); Fernando Iniesta Lozano, Madrid (ES); Maria Almudena Canas Rios, Madrid (ES)

(73) Assignee: Airbus Operations S.L., Madrid (ES)

( * ) Notice: Subject to any disclaimer, the term of this patent is extended or adjusted under 35 U.S.C. 154(b) by 347 days.

(21) Appl. No.: 16/441,448

(22) Filed: Jun. 14, 2019

(65) Prior Publication Data

US 2019/0382137 A1 Dec. 19, 2019

(30) Foreign Application Priority Data

Jun. 19, 2018 (EP) .................................... 18382440

(51) Int. Cl.
*B64F 5/10* (2017.01)
*B64C 1/06* (2006.01)

(52) U.S. Cl.
CPC ................ *B64F 5/10* (2017.01); *B64C 1/069* (2013.01); *B64C 1/0685* (2020.01); *Y10T 156/10* (2015.01)

(58) Field of Classification Search
CPC ......... B64F 5/10; B64C 1/0685; B64C 1/069; Y10T 156/10
See application file for complete search history.

(56) References Cited

U.S. PATENT DOCUMENTS 6,613,258 B1 * 9/2003 Maison ................. B29C 66/112
264/102
8,152,948 B2 * 4/2012 Darrow ............. B29D 99/0014
156/242

(Continued)

FOREIGN PATENT DOCUMENTS

EP 2 889 211 7/2015
EP 3 106 382 12/2016

(Continued)

OTHER PUBLICATIONS

Search Report for EP 18 38 2440 dated Nov. 20, 2018, 2 pages.

*Primary Examiner* — Ryan J. Walters
(74) *Attorney, Agent, or Firm* — Nixon & Vanderhye P.C.

(57) ABSTRACT

A method for manufacturing a composite assembly of an empennage and rear-fuselage having a continuous skin solution. The method obtains parts of the sub-structure. For each part, it is obtained a plurality of stringers performs and frames preforms by composite tooling. The frames are transferred to curing frames molds and a sub-structure skin is obtained. Furthermore, the method includes integrating the parts over an integration tool having cavities for locating the curing frames molds and the stringer performs. Furthermore, the method includes co-curing the integration tool in one shot on an autoclave, demolding the sub-structure skin sections and disassembling the curing frame molds to obtain the composite assembly of the rear section.

4 Claims, 7 Drawing Sheets

(56) References Cited

U.S. PATENT DOCUMENTS

| | | | |
|---|---|---|---|
| 9,782,960 B1* | 10/2017 | Robins | B64C 3/18 |
| 9,962,917 B2* | 5/2018 | Inserra Imparato | B32B 37/0046 |
| 2010/0000667 A1* | 1/2010 | Funnell | B29C 33/48 |
| | | | 156/189 |
| 2013/0240130 A1* | 9/2013 | Funnell | B29C 70/342 |
| | | | 156/189 |
| 2016/0368585 A1* | 12/2016 | Farouz-Fouquet | B64C 1/12 |

FOREIGN PATENT DOCUMENTS

| | | |
|---|---|---|
| FR | 2 766 407 | 1/1999 |
| WO | 2008/020158 | 2/2008 |

* cited by examiner

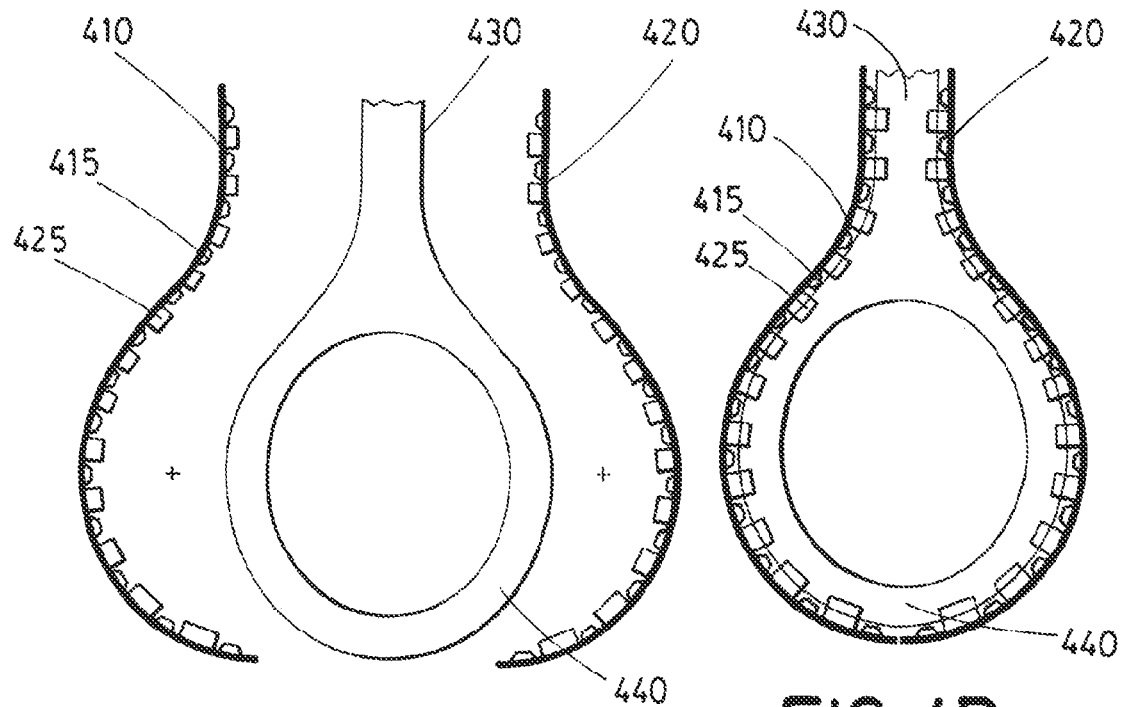
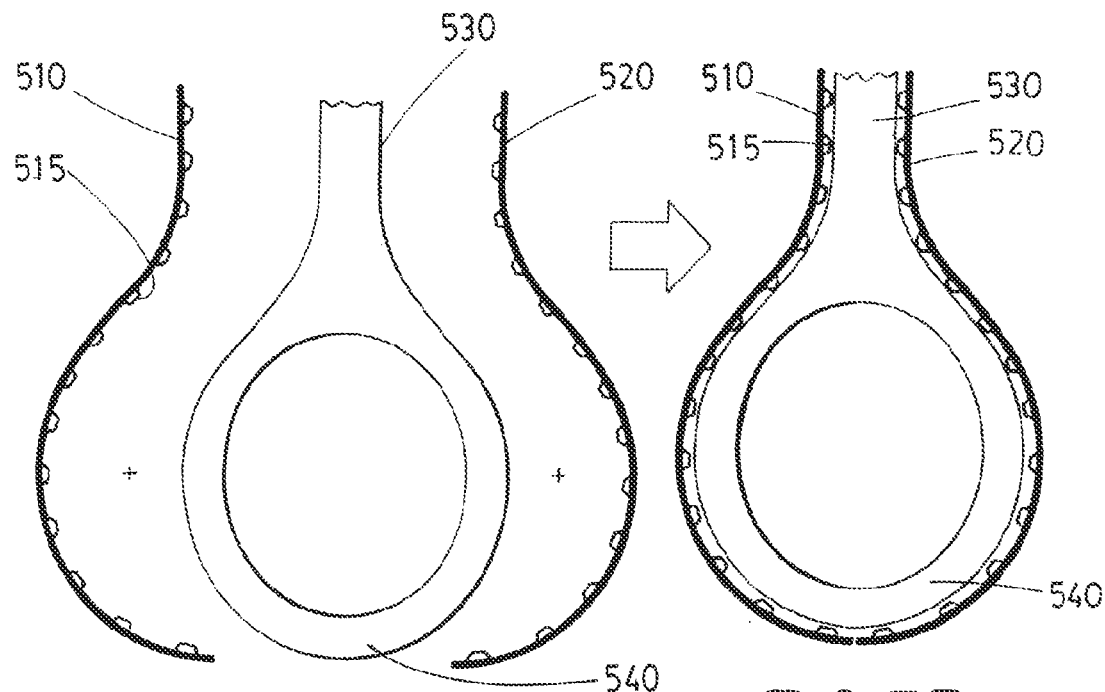

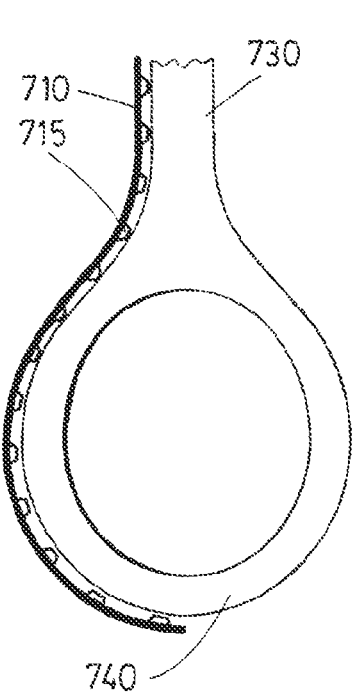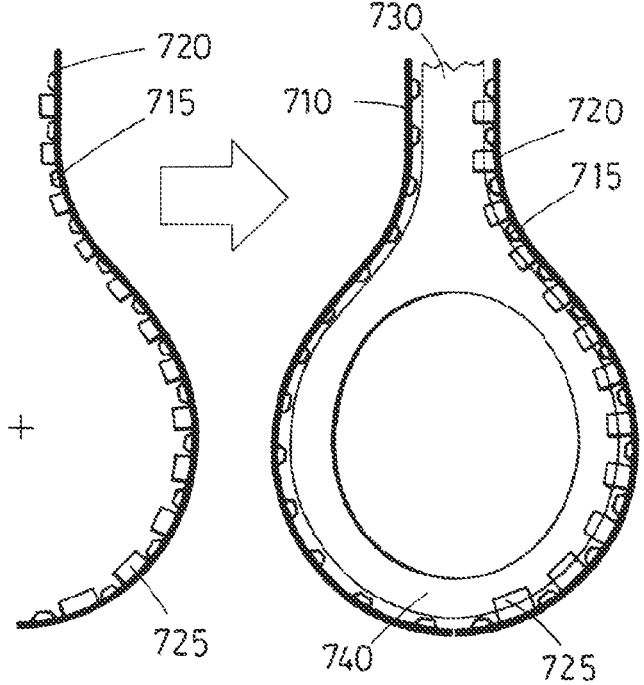
Fig. 7Ai    Fig. 7Aii
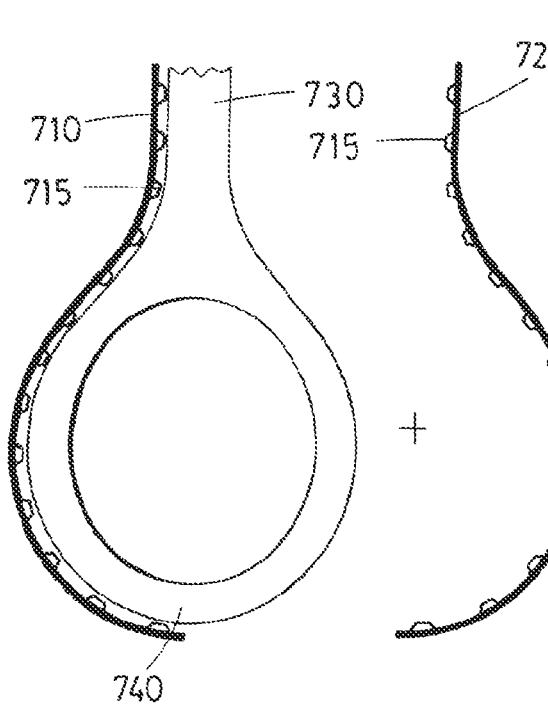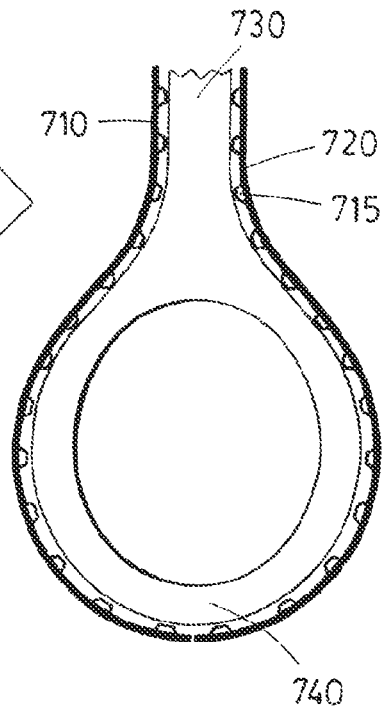
Fig. 7Bi    Fig. 7Bii

METHOD FOR MANUFACTURING A REAR SECTION OF AN AIRCRAFT AND AIRCRAFT REAR SECTION

RELATED APPLICATION

This application claims priority to European patent application 18382440-8, filed Jun. 19, 2018, the entirety of which is incorporated by reference.

FIELD OF THE INVENTION

The present invention refers to a method for manufacturing a rear section of an aircraft, particularly for manufacturing the tail cone and the vertical tail plane of an aircraft at the same time. The present invention also refers to the aircraft rear section manufactured by said method.

The present invention refers to a manufacturing process for obtaining a composite assembly of an empennage and fuselage of an aircraft based on a continuous skin solution and the integration of two or more halves of fuselage.

BACKGROUND OF THE INVENTION

Conventionally, to build an aircraft fuselage, a series of frames in the shape of the fuselage cross sections are held in position on a rigid fixture. These frames are then joined with the fuselage skin panels that includes lightweight longitudinal elements called stringers that increase the buckling resistance of the skin. The stringers are attached to the skin by means of riveting, by cured resin or by bonding with special adhesives. The junction of the skin panels and the frames is performed by means of angular interface parts called shear ties that joint the frame web and the fuselage skin, to conform the complete fuselage. In some cases, these angular parts can be part of the frame as an integrated flange.

The vertical tail plane is conventionally formed by a structural primary torsion box, a leading, a trailing edge and a movable surface. The primary box is formed by a skin, two or more spars and internal ribs. When the number of spars is sufficient, total or part of the ribs could be removed.

In known aircrafts the junction between the vertical tail plane and the fuselage rear section is performed by means of interface fittings. These fittings are in charge of transferring the loads on the skins of the torsion box of the empennage, into punctual loads that are transferred to the frames of the fuselage. Frames then distribute the loads to the fuselage skin. Examples of interface fittings are longitudinal load fittings and transversal load fittings as shown in FIG. 1A, FIG. 1B and FIG. 2.

The loads at those interface fittings are very high because they concentrate on punctual areas of the structure, leading to significant reinforcement and penalty weight for the fitting and surrounding elements. Additionally, the fitting need to be covered by aerodynamic fairing that produces significant penalty of drag and on assembly lead time.

Optionally, in certain aircraft configurations with rear fuselage mounted engine, it is required to integrate a shield in the vertical tail plane to stop potential debris crossing between engines.

SUMMARY OF THE INVENTION

Therefore, a new assembly of the empennage of an aircraft that includes at least the rear fuselage and the vertical tail plane with a continuous skin that solves the aforementioned drawbacks and methods for its manufacturing is desired.

With the manufacturing method according to the present disclosure is possible to easier the assembly of an empennage to the rear fuselage having a continuous skin solution, hereafter called sub-structure. Several parts of the fuselage can be integrated in order to obtain a full assembly of the empennage. In some examples, two halves of the sub-structure can be used to obtain the composite assembly. In other examples, sub-structure could be split into more than two parts to obtain the final assembly of the empennage.

Hence, the assembly of the empennage can include at least the vertical tail plane or part of the vertical tail plane, and the rear fuselage which can be manufactured in one shot with a continuous skin that in one example, it can be split in two parts with respect to the middle vertical plane of the aircraft or more parts. The proposed assembly allows also manufacturing stringers integrated in the skin and optionally joining parts, and to add frames afterwards, but it is also possible to have the frames partially or fully integrated.

In one aspect, the present invention refers to a manufacturing process of a composite fuselage with an empennage of an aircraft having a continuous skin solution. The process of manufacturing comprises obtaining two halves of the shell to be assembled in order to obtain the integrated fuselage and empennage. For each half shell, first the process obtains a plurality of stringers preforms and a plurality of frames preforms by corresponding tooling. The frames preforms are transferred to curing frames moulds. The stringers and frames can be pre-cured independently on a dedicated tool or cured directly on an "integration tool". Furthermore, sections of the fuselage skin are obtained by composite tooling with a 3D external shaped tool. In a first option, the skin shell is pre-cured with the stringers in a separate dedicated tool obtaining therefore a fuselage shell. In a second option, the skin with pre-cured stringers are cured directly on an "integration tool". In a third option, the skin is pre-cured independently on a dedicated tooling.

In other examples, a higher number of divisions of the fuselage, (i.e. more than two halves) can be used in order to easier the sub-structure manufacturing.

The manufacturing process continues by integrating the fuselage sections in an "integration tool". The integration tool comprises cavities for locating the curing frames molds and the stringers preforms. The curing frames molds are positioned in cavities adapted to allocate the curing frames molds in the integration tool. Furthermore, the stringers preforms or pre-cured are located in their respective cavities in the integration tool.

In some examples according to the first and third option, the skin fuselage sections are laid-up and pre-cured over a separate dedicated tool and then transferred to the integration tool. In some examples according to the second option, the skin fuselage sections are laid-up and cured directly over the integration tool. In an embodiment the integration tool follows a male tool concept. In other examples, the integration tool comprises a female concept.

Furthermore, skin, stringers and frames are integrated on the integration tool in one shot curing cycle. The fuselage skin sections are demolded and the curing frame molds are disassembled to obtain the two cured halves of the fuselage of the aircraft. Then, a final step of joining the two half-shells using joining means is then performed. In some examples, different joining means as e.g. shear joints, tension bolts, fasteners could be used.

An advantage of this invention is that it allows manufacturing two halves (or more parts if required) of the fuselage including at least stringers (with or without frames) to obtain a composite assembly of an empennage with a continuous skin and integrated in one single manufacturing step. Hence, the number of parts to be joined is significantly reduced and as consequence, the assembly cost and lead time is also reduced.

The union between the shell and frames may be obtained by bonding using adequate adhesive and curing cycle described above. In an alternative embodiment the frames and shells are joined by a co-curing process. In an alternative embodiment the frames and skins are joined mechanically by means of fasteners. In all the embodiments the continuous transition between tail plane and fuselage is obtained. It is assumed in all options that stringers and skins are co-cured or bonded. Preferably, it is assumed that skin, stringers and frames are from thermoset material. In an alternative embodiment, skin, stringers or frames are from thermoplastic material and in that case processes for integration are co-consolidation, bonding or any other as welding.

Additionally, there are other advantages in manufacturing a composite assembly of the empennage with a continuous skin:

The loads are not transferred only to discrete points as in fuselages including interface fittings as previously mentioned. In contrast, the loads transferred are continuously supported by frames held in cross section of the fuselage. A transition surface between fuselage tail conic cylinder and the vertical tail plane profile allows a smooth transition between those surfaces so that vertical tail plane skin loads can pass directly to the fuselage skin on a continuous manner. Hence, it is not needed to use conventional interface fittings and fasteners in contrast to conventional assemblies.

By getting rid of the interface fittings in the union between the vertical tail plate and the rear fuselage, there is an important weight reduction: Removing vertical tail plane fairings permits eliminating penalty weight.

There is an important aerodynamic drag reduction: The removal of the vertical tail plane fitting fairings permits and smother transition of skin, hence it permits reducing aerodynamic drag. In some examples, tests on installation drag coefficient in cruise conditions due to fairing installation show a reduction of the total aerodynamic drag.

Shielding manufacturing and assembly simplification can be achieved because of the removal of riveted elements and other interface elements as e.g. fittings, fairings, fasteners, etc. do not take part into the construction of the assembly having a continuous skin concept according to the present disclosure. Integrated tail cone section and vertical tail plane blade impact shield. According to the proposed assembly, the blade shielding is continuous instead of being divided between the vertical tail plane and tail cone section and therefore, a minimum number of interfaces is used and the shielding integrations works better and shielding weights can be e.g. 30 Kg lower compared to existing solutions.

A structure more resilient to damages: The achieved continuous load path and shielding provides more tolerance to damages. Furthermore, vertical tail plane fittings fairings can be a mechanical issue for acoustic fatigue, vibration and debris release in case of engine debris impact. Hence, the proposed assembly removes these issues because fairings are not required anymore for the proposed assembly construction.

Continuous skin concept reduces the punctual load transmitted to the frame by the interface fittings in conventional assemblies. This reduction permits decreasing dimension constrains on the load frames due to the integration of such interface fittings. As a result, optimization of the frame height and thickness is possible, resulting on a weight reduction.

SUMMARY OF THE DRAWINGS

For a better understanding the above explanation and for the sole purpose of providing an example, some non-limiting drawings are included that schematically depict a practical embodiment.

FIGS. 4A and 4B shows a first way to join two sub-structure halves according to the present disclosure.

FIGS. 5A and 5B shows a second way to join two sub-structure halves according to the present disclosure.

FIGS. 7Ai, 7Aii, 7Bi and 7Bii show a fourth way to join two sub-structure halves according to the present disclosure.

DETAILED DESCRIPTION OF THE INVENTION

Figure 1A:
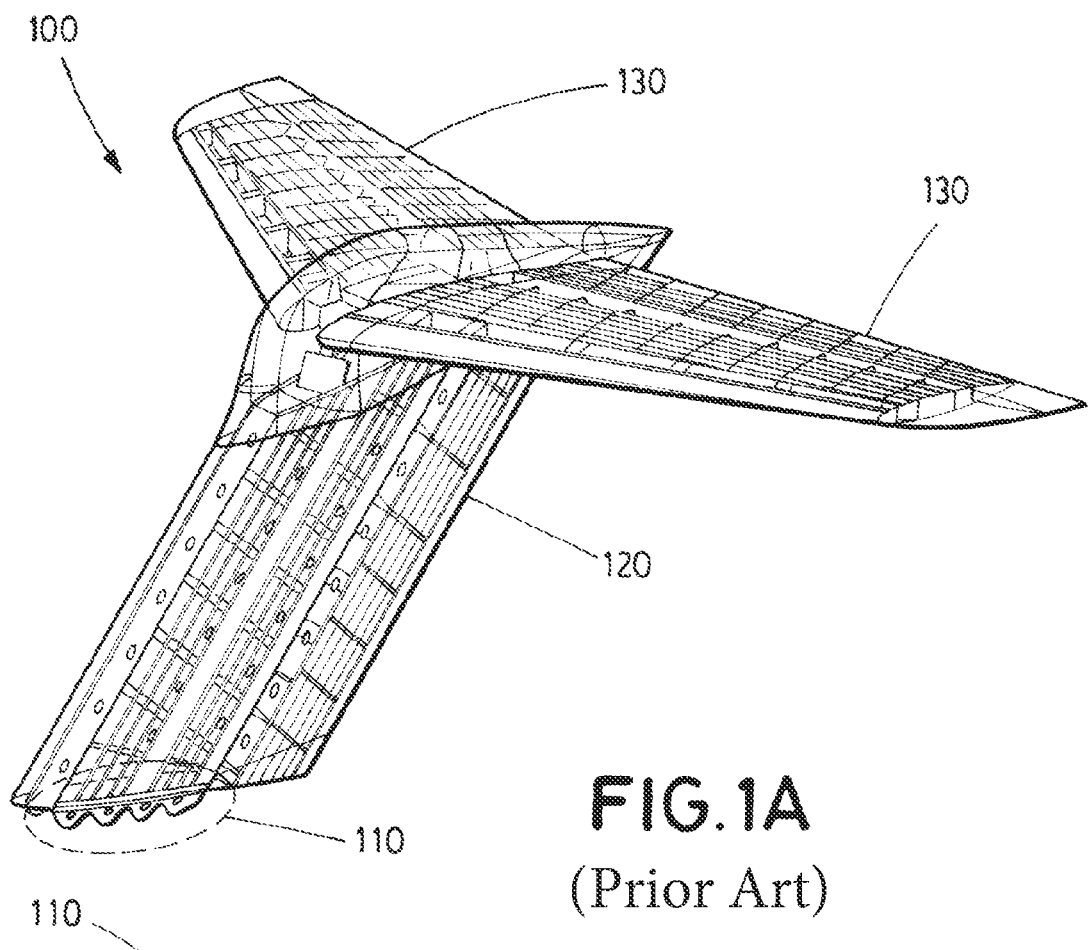
FIGS. 1A and 1B shows a conventional T-shape vertical tail plane and interface fittings comprising longitudinal load fittings and transversal load fittings.
Figure 1B:
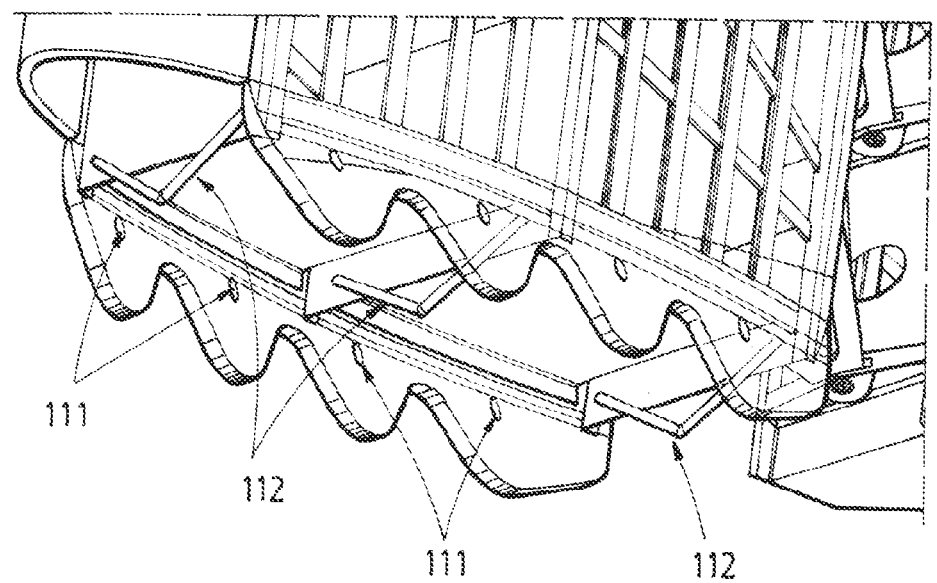

FIG. 1A shows a conventional T-shape vertical tail plane (100). The vertical tail plane (100) comprises a rudder (120) and elevators (130) and interface fittings (110). FIG. 1B shows the interface fittings divided by longitudinal load fittings (111) and transversal load fittings (112) of a conventional vertical tail plane of an aircraft.

Figure 2:
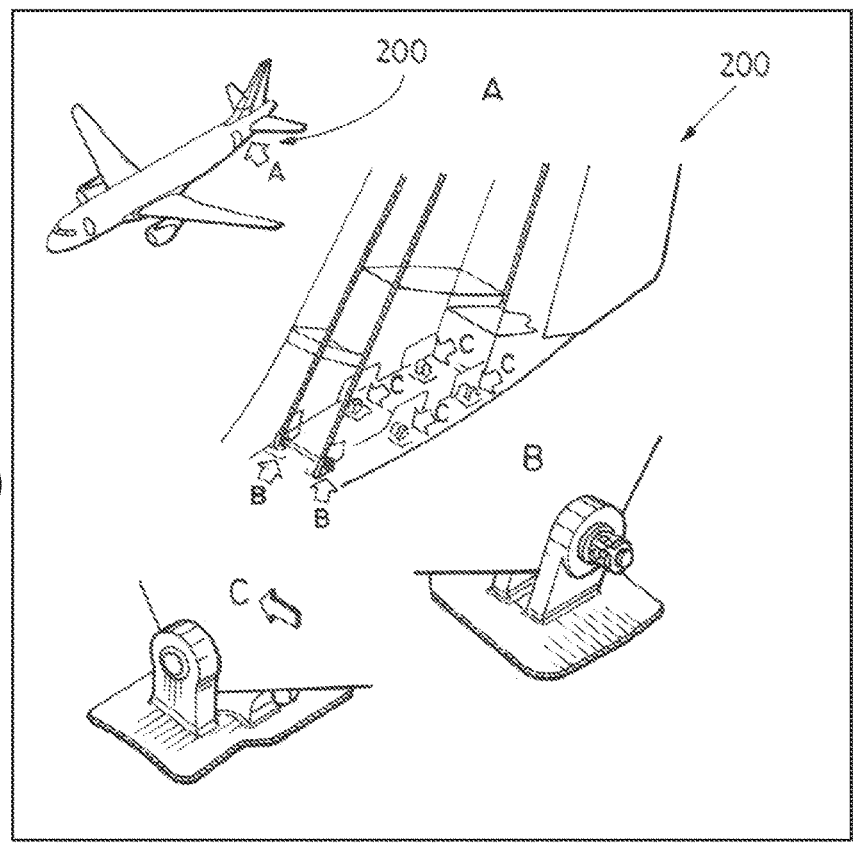
FIG. 2 shows examples of conventional vertical tail plane lugs and lateral attachments.

FIG. 2 shows examples of conventional vertical tail plane lugs and lateral attachments (200).

Figure 3:
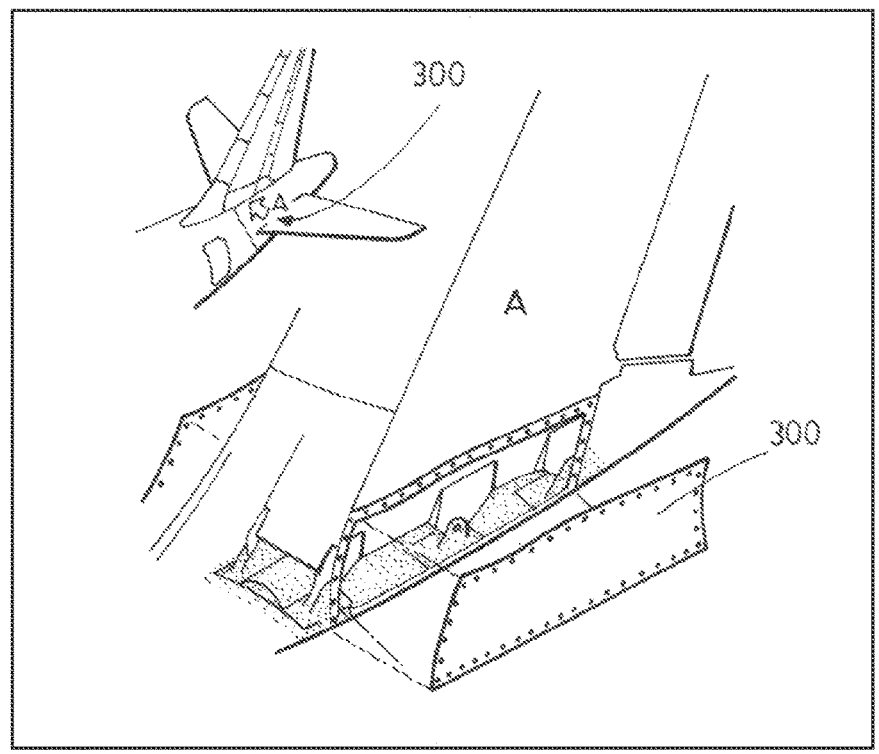
FIG. 3 shows conventional fairings to cover interface fittings as shown in FIGS. 1A, 1B and 2.

FIG. 3 shows conventional fairings (300) to cover interface fittings as the ones shown in FIGS. 1A, 1B and 2.

FIGS. 4A and 4B show a first way to join two sub-structures halves according to the present disclosure in order to easier the sub-structure manufacturing. FIG. 4A shows a first skin half (410) and a second skin half (420). The first and the second skin halves (410) and (420) can be manufactured in one single shot including the stringers (415) and the joining parts (425). Frames (440) and spars (430) are joined to the two half skins (410) and (420) through the joining parts (425) and joining means comprised in the frames (440) and spars (430) as shown in FIG. 4B. In some examples, the joining means comprise clips.

FIGS. 5A and 5B show a second way to join two sub-structure halves according to the present disclosure in order to easier the sub-structure manufacturing of an empennage of an aircraft. FIG. 5A shows a first skin half (510) and a second skin half (520) both manufactured in one shot and including stringers (515). Frames (540) and spars (530) are joined to the two half skins (510) and (520) through the joining means which are lately added as shown in FIG. 5B.

Figures 6A, 6B:
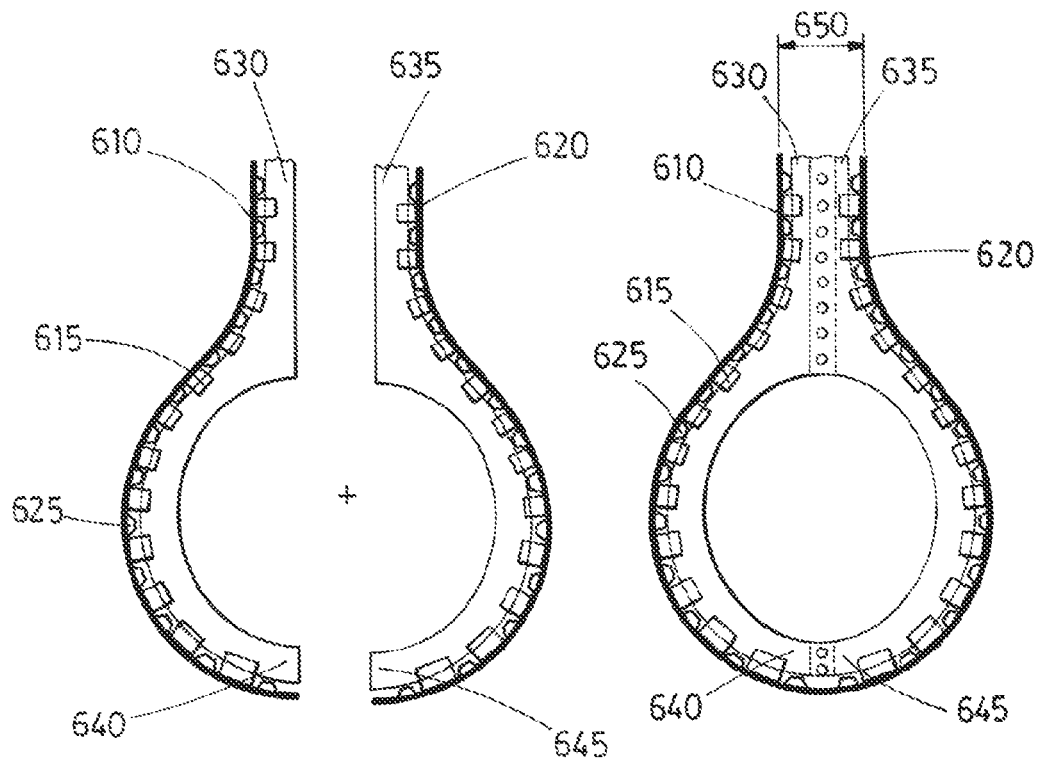
FIGS. 6A, 6B and 6C show a third way to join two sub-structure halves according to the present disclosure.
Figure 6C:
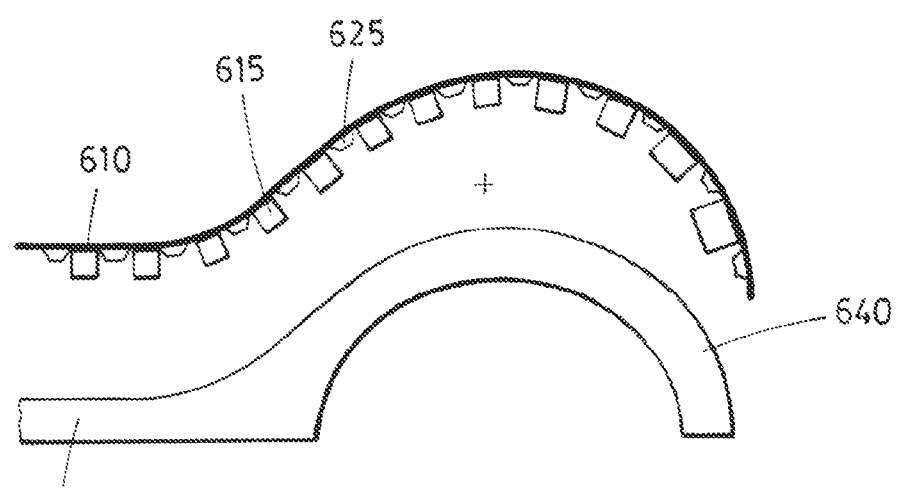

FIGS. 6A, 6B and 6C show a third way to join two sub-structure halves according to the present disclosure in order to easier the sub-structure manufacturing of an empennage of an aircraft. A first sub-structure half comprises a first skin half (610), a spar half (630) and a frame half (640), as well as stringers (625) and (optionally) joining parts (615). A second sub-structure half comprises a second skin half (620), a second spar half (635) and a second frame half (645), as well as stringers and (optionally) joining parts.

The frames halves (640) and (645) and spar halves (630) and (635) can be integrated or joined to each half skin (610) and (620), respectively by mechanical discrete means. The frames webs joint (650) is located at a symmetrical plane. The frames webs are joined in double shear manner with additional splices or single shear established directly on webs. The half skins (610) and (620) could be also manufactured in one shot including stringers (615) and half frames and spars which can be integrated through co-curing, co-bonding or equivalent methods, e.g. welding in thermoplastic as shown in FIG. 6C. Hence, the skin half-shells (610) and (620) are joined at the lower position as well as frames (640), (645) by mechanical means.

FIGS. 7Ai, 7Aii, 7Bi and 7Bii show a fourth way to join two sub-structure halves according to the present disclosure in order to easier the sub-structure manufacturing of an empennage of an aircraft. FIGS. 7Ai, ii shows a first skin half (710) manufactured on one shot with stringers (715), spars (730) and frames (740). A second skin half (720) includes stringers (715) and (optionally) joining parts (725) to close the ensemble by joining means that can be discrete or continuous joining means. FIGS. 7Bi, ii shows the second skin half (720) without joining parts (725).

Figure 8A:
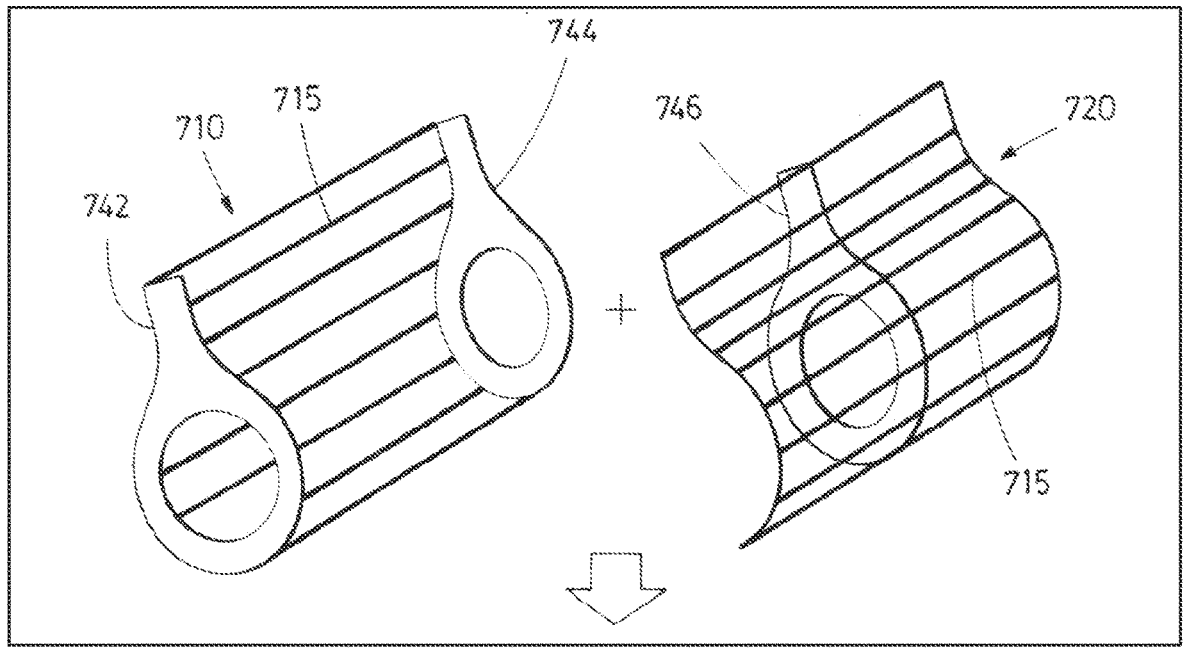
FIGS. 8A and 8B show a fifth way to join two sub-structure halves according to the present disclosure.
Figure 8B:
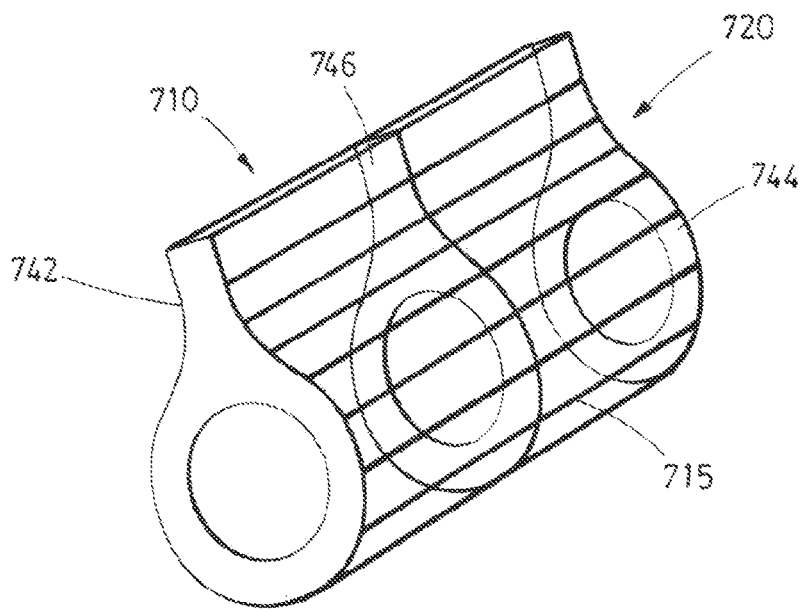

FIGS. 8A and 8B show an isometric view of another option for the fourth way to join the two halves shown in FIGS. 7A and 7B. FIG. 8A shows the first skin half (710) manufactured on one shot including stringers (715) and two external frames (742) and (744) and the second skin half (720 including stringers (715) and the remaining intermediate frames (746). Shells are assembled directly to the frame feet or joining parts as shown in FIG. 8B.

All previously showed processes permit to include frame shear ties in the manufacturing process of half skins by continuous surface contact means as resin or bonding interfaces performed by co-curing, co-bonding or secondary co-bonding or equivalent methods. It makes easier assemble the frames. The rig must include, in this case, stringers and shear tie allocations. Alternatively integrated frames are possible, in which the frame feet (external flanges) directly joins the skin.

Figure 9:
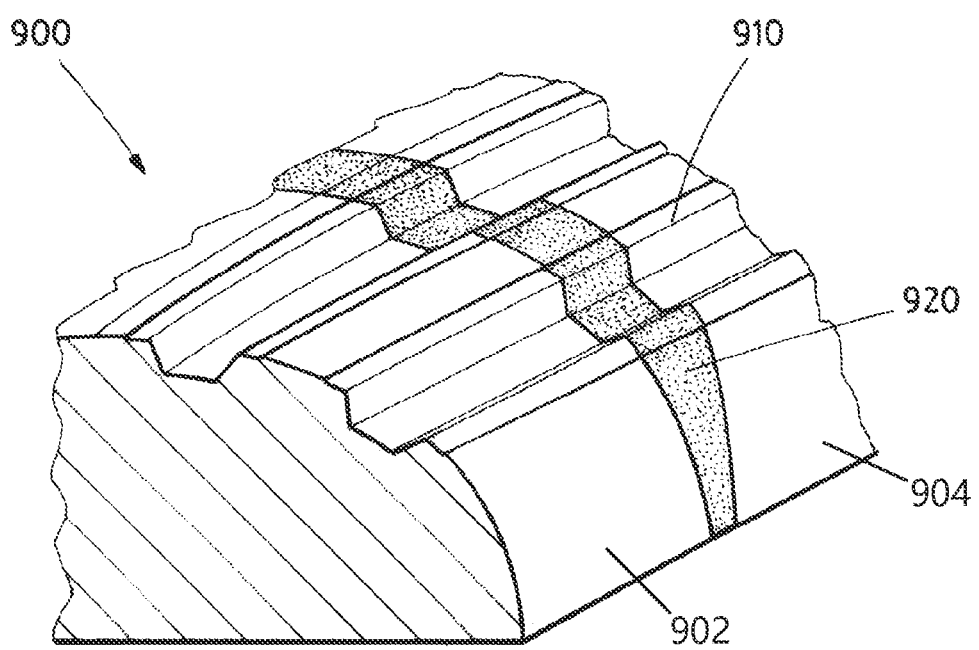
FIG. 9 shows an example of an integration tool according to the present disclosure.

FIG. 9 shows an integration tool (900) according to the present disclosure. The integrated tool is used in an example of a manufacturing process according to the present disclosure that is being described below:

The manufacturing process disclosed herein permits obtaining a composite assembly of an empennage of an aircraft having a continuous skin solution based on the integration of two or more halves of sub-structure. The manufacturing process uses pre-impregnated Carbon fiber reinforced polymer (CFRP) composite.

For each half of the sub-structure, the proposed manufacturing process comprises a plurality of steps. In particular, the process comprises a step for obtaining stringer preforms. In this regard, omega stringers or T-stringers can be layed-up in a flat plate and formed in a subsequent hot-forming process with membrane in a tool that forces the composite to get the desire form. The tooling performed to obtain the stringer preforms can be a male concept or a female concept. This process is also applicable to joining parts as frames and spars shear-ties. In some examples, in order to perform the perform stringers lay-up, a forming process with a press tool can be performed. Roll forming and pultrusion processes can be used for manufacturing the stringers preforms.

Furthermore, the proposed manufacturing process comprises a step for obtaining frames preforms. Frames preforms are laid-up in a flat plate and formed in a subsequent hot-forming process with membrane in a male tool. After that, frame preforms are transferred to each corresponding curing mold. In some examples, stamping, braiding, roll forming and pultrusion processes could be used in order to obtain the frames preforms. Furthermore, frames could be cured separately and integrated to the skin afterwards through mechanical or chemical (co-bonded, bonding) systems.

In order to obtain the skin of the sub-structure, CFRP composite layers are laminated over a 3D shaped tool by means of a fibre placement machine. In a first scenario, the skin could be layed-up directly over an integration tool. In this regard, internal molds can be added inside the (omega) stringers profile to allow a smooth surface for the direct laying of the skin over the integration tool. In a second scenario the skin could be laid-up directly over a dedicated tool. In this respect, a transfer operation of the skin to the integration tool is required.

Integration of stringers and frames is performed in an integration male tool (900) with cavities for frames mold location (920) and cavities for stringer preforms positioning (910) as shown in FIG. 9. A frame mold location (920) is sandwiched between opposing ends of a frame first integration male tool section (902) and a second integration male tool section (904). Cavities (910) for the stringers extend across the surfaces of the first and second integration male tool sections (902, 904) and are generally perpendicular to the frame mould location (920). FIG. 9 does not show a frame preform stringers or skin. Frame preforms are transferred to curing mould and positioned in the frame mold location (920) of the integration tool (900). The stringers and skin(s) are applied to the outer surface of the integration tool (900) such that the stringers are seated in the cavities (920) and the skin covers the inspection tool, stringer and frame preform. In a first scenario, the skin is lay-up over the integration tool or alternatively, it can be transferred from its dedicated laying tool. In some examples, external caul-plates (if needed) and a vacuum bag can be located in the integration tool. In some examples, a female concept for integration tool is also applicable.

Furthermore, composite curing is performed. The integration tool with composite laminate inside is co-cured on an auto-clave in one-shot process. Latterly, the demolding operation is performed out of the autoclave. The skin is demolded in a vertical way with frame molds attached. The frame molds will be disassembled in a longitudinal way. Same process could be applicable to CFRP composite dry-fibers materials. Resign transfer molding, RTM or vacuum infusion process could be applied with the similar integration tooling concept.

Even though reference has been made to a specific embodiment of the invention, it is obvious for a person skilled in the art that the composite assembly described herein is susceptible to numerous variations and modifications, and that all the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for manufacturing a composite assembly of a rear section of an aircraft including a rear portion of a fuselage and a vertical tail, the method comprising:

obtaining a first skin section and a second skin section, wherein each of the first skin section and the second skin section includes skin for the fuselage and the vertical tail, and wherein each of the first skin section and the second skin section include stringer preforms;

obtaining a frame preform, wherein the frame preform includes at least a portion of a frame for the fuselage and at least a portion of a spar for the vertical tail;

positioning the first skin section and the second skin section over a first integration tool section and a second integration tool section each comprising first cavities configured to receive the stringer preforms;

positioning the at least one frame preform in a second cavity formed between opposing ends of the first integration tool section and the second integration tool section;

co-curing the first skin section, the second skin section and the frame preform in a single operation in an autoclave to form a first cured assembly including the frame preform joined to the first skin section, and a second cured assembly including the second skin section;

demolding the first cured assembly and the second cured assembly from the first integration tool section and the second integration tool section; and joining the first cured assembly with the second cured assembly to form a combined assembly wherein the first skin section and the second skin section together form a skin for the rear portion and stringers for the fuselage of the rear portion, and the frame preform forms at least a portion of a frame of the fuselage and the spar of the vertical tail.

2. The method of claim 1, wherein the first skin section and the second skin section each including joining parts, and the joining parts engage the frame preform when the frame preform is positioned in the second cavity, and the first skin section and the second skin section are positioned over the first integration tool section and the second integration tool section.

3. The method of claim 1, wherein the first integration tool section and the second integration tool section are sections of male integration tool.

4. The method of claim 1, wherein the joining step comprises joining the first cured assembly and the second cured assembly by mechanical means or by adhesive bonding means.

* * * * *